United States Patent
Fan

(10) Patent No.: US 9,900,519 B2
(45) Date of Patent: Feb. 20, 2018

(54) IMAGE CAPTURE BY SCENE CLASSIFICATION

(71) Applicant: Zhigang Fan, San Jose, CA (US)

(72) Inventor: Zhigang Fan, San Jose, CA (US)

(73) Assignee: SKR Labs, LLC, Webster, NY (US)

( * ) Notice: Subject to any disclaimer, the term of this patent is extended or adjusted under 35 U.S.C. 154(b) by 5 days.

(21) Appl. No.: 15/081,281

(22) Filed: Mar. 25, 2016

(65) Prior Publication Data
US 2016/0286114 A1    Sep. 29, 2016

Related U.S. Application Data

(60) Provisional application No. 62/138,677, filed on Mar. 26, 2015.

(51) Int. Cl.
| | |
|---|---|
| *H04N 5/225* | (2006.01) |
| *H04N 5/238* | (2006.01) |
| *G06K 9/46* | (2006.01) |
| *H04N 5/235* | (2006.01) |
| *G06K 9/62* | (2006.01) |
| *H04N 5/232* | (2006.01) |
| *G02B 7/28* | (2006.01) |

(52) U.S. Cl.
CPC .......... *H04N 5/2352* (2013.01); *G02B 7/285* (2013.01); *G06K 9/4661* (2013.01); *G06K 9/6267* (2013.01); *H04N 5/23212* (2013.01)

(58) Field of Classification Search
CPC ............... H04N 5/2256; H04N 5/2254; H04N 5/23293; H04N 5/23245; H04N 5/2354
See application file for complete search history.

(56) References Cited

U.S. PATENT DOCUMENTS

| | | | |
|---|---|---|---|
| 2011/0157425 A1* | 6/2011 | Nakayama | H04N 5/23245 348/234 |
| 2013/0058577 A1* | 3/2013 | Stubler | G06K 9/6218 382/195 |

\* cited by examiner

*Primary Examiner* — Twyler Haskins
*Assistant Examiner* — Carramah J Quiett

(57) ABSTRACT

A method, a device and a computer readable for automatically identifying a Christmas tree scene and setting a camera's focus and/or exposure parameters in a way that yields images with high image quality. The Christmas tree scene identification can be performed by segmenting the image into bright and dark regions, identifying the light objects, collecting the statistics of the light objects, and classifying the scene based on the statistics of the light objects, or by collecting the pixel value statistics for the image, and classifying the scene based on the statistics of the pixel values, or by collecting the pixel value statistics for the image, filtering the image, collecting the pixel value statistics for the filtered image, and classifying the scene by comparing the statistics of the pixel values before and after filtering. The focus and exposure settings can be adjusted based on the Christmas tree scene identification results. For Christmas tree scenes, the exposure can be set based on a value that is adjusted upwards from the mean luminance of the image, or on a value that is calculated from the top luminance value. The focus can be set by identifying the lights in the image, and minimizing the light size in the image.

20 Claims, 8 Drawing Sheets

IMAGE CAPTURE BY SCENE CLASSIFICATION

CROSS-REFERENCE TO RELATED APPLICATION

This application hereby claims priority under 35 U.S.C. .sctn.119 to U.S. Provisional Patent Application No. 62/138,677 filed Mar. 26, 2015, entitled "IMPROVED IMAGE CAPTURE BY SCENE CLASSIFICATION," the disclosure of which is incorporated herein by reference.

TECHNICAL FIELD

Embodiments are generally related to image capture and processing methods and devices. Embodiments are further related to image capture and processing methods and devices using scene classification.

BACKGROUND OF THE INVENTION

With an increasing demand for easier usage and better image quality, digital cameras are typically equip with automatic capture settings, particularly auto focus and auto exposure. For digital cameras based on personal electronic devices, the automatic setting is often essential.

In auto focus, many cameras, particularly the cameras attached to the personal electronic devices use a "passive autofocus". A passive autofocus captures images at two or more candidate lens positions. The amount of blur for each image can then be determined. Conventionally, this is estimated using a contrast measure. The lens position associated with the maximum amount of contrast is considered to be the best focus position.

In auto exposure, a mean luminance level is conventionally measured for the entire image, over a region of interest, or over a multiple windows of the image. The mean luminance level is compared to a target level. The exposure is adjusted to minimize the difference between the mean luminance level and the target.

In auto exposure, it has been proposed to categorize the type of scene currently being exposed based on the luminance values of a set of predetermined image regions. Then, based on the determined scene categorization, the exposure can be adjusted more effectively.

Christmas tree is one of the scenes that frequently attracts picture takers. It is often featured with a dark background with many small lights. However, the current scene adaptive auto focus and auto exposure often fail for Christmas tree scenes.

Thus, there is need for devices, methods, and a computer readable medium for intelligently setting a camera's focus and exposure parameters for Christmas tree scene so that the images captured are of high quality. Here, the term "Christmas tree scene" is used not only for the night scenes with lighted Christmas trees, but also for the similar scenes that are composed mainly of a dark background with multiple small lights.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide for an improved image capture and processing method and device including the use of scene classification to obtain better image quality.

The aforementioned aspects and other objectives and advantages can now be achieved as described herein. A method, a device and a computer readable for performing an auto-exposure or auto-focus operation in an image capture device, the method comprising: receiving a plurality sets of pixel values representing an image of a scene; classifying said scene as Christmas tree scene or non-Christmas tree scene; performing a first focus adjustment method or applying a first set of focus adjustment parameters, or performing a first exposure adjustment method or applying a first set of exposure adjustment parameters if said scene is classified as Christmas tree scene; performing a second focus adjustment method or applying a second set of focus adjustment parameters if said scene is classified as non-Christmas tree scene, wherein said second focus adjustment method is substantially different from said first focus adjustment method, or said second set of focus adjustment parameters are substantially different from said first set of focus adjustment parameters, or performing a second exposure adjustment method or applying a second set of exposure adjustment parameters if said scene is classified as non-Christmas tree scene, wherein said second exposure adjustment method is substantially different from said first exposure adjustment method, or said second set of exposure adjustment parameters are substantially different from said first set of exposure adjustment parameters.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

This disclosure pertains to devices, methods, and a computer readable for automatically identifying a Christmas tree scene and setting a camera's focus and/or exposure parameters in a way that yields high image quality. While this disclosure discusses a new technique for auto focus and auto exposure, one of ordinary skill in the art would recognize that the techniques disclosed may also be applied to other contexts and applications as well. The techniques disclosed herein are applicable to any number of electronic devices with digital image sensors, such as digital cameras, digital video cameras, mobile phones, personal data assistants (PDAs), portable music players, computers, and conventional cameras. A computer or an embedded processor that provides a versatile and robust programmable control device that may be utilized for carrying out the disclosed techniques.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
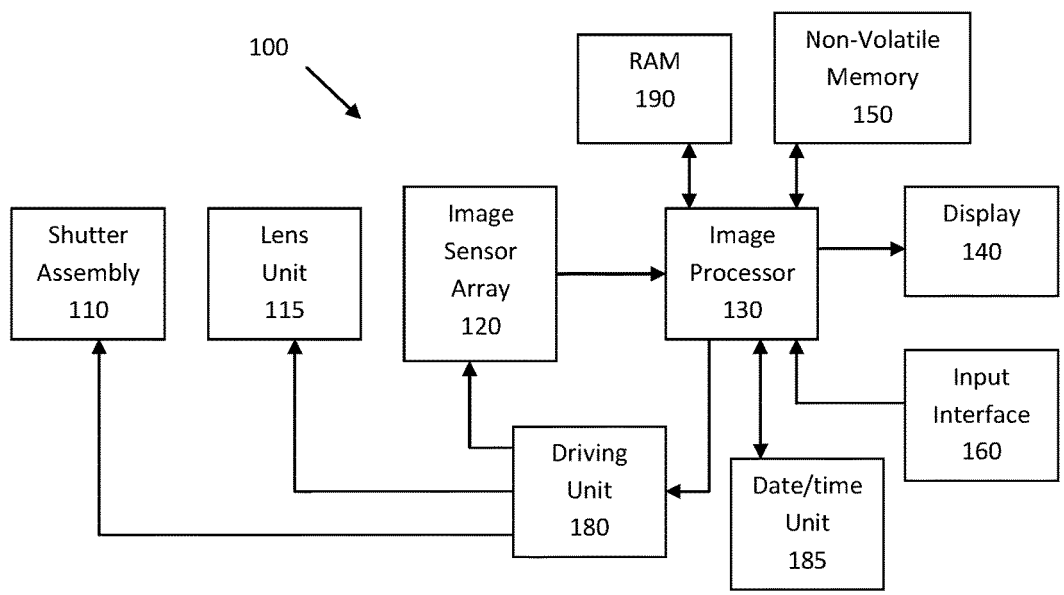
FIG. 1 illustrates a block diagram of an example camera.

Referring now to FIG. 1, a block diagram of a camera used to illustrate an example embodiment in which several aspects of the present invention may be implemented. Camera 100 is shown containing shutter assembly 110, lens unit 115, image sensor array 120, image processor 130, display 140, non-volatile memory 150, input interface 160, driving unit 180, date/time unit 185, and RAM 190. Only the components as pertinent to an understanding of the operation of the example embodiment are included and described, for conciseness and ease of understanding. Each component of FIG. 1 is described in detail below.

Lens unit 115 may contain one or more lenses, which can be configured to focus light rays from a scene to impinge on image sensor array 120.

Image sensor array 120 may contain an array of sensors, with each sensor generating an output value representing the corresponding point (small portion or pixel) of the image, and proportionate to the amount of light that is allowed to fall on the sensor. The output of each sensor may be amplified/attenuated, and converted to a corresponding digital value (for example, in RGB format). The digital values, produced by the sensors are forwarded to image processor 130 for further processing.

Shutter assembly 110 operates to control the amount of light entering lens enclosure 115, and hence the amount of light falling/incident on image sensor array 120. Shutter assembly 110 may be operated to control either a duration (exposure time) for which light is allowed to fall on image sensor array 120, and/or a size of an aperture of the shutter assembly through which light enters the camera. A longer exposure time would result in more amount of light falling on image sensor array 120 (and a brighter captured image), and vice versa. Similarly, a larger aperture size (amount of opening) would allow more light to fall on image sensor array 120, and vice versa.

Though the description is provided with respect to shutter assemblies based on mechanical components (which are controller for aperture and open duration), it should be appreciated that alternative techniques (e.g., polarization filters, which can control the amount of light that would be passed) can be used without departing from the scope and spirit of several aspects of the present invention. Shutter assembly 110 may be implemented in a known way using a combination of several of such technologies, depending on the available technologies (present or future), desired cost/performance criteria, etc.

Driving unit 180 receives digital values from image processor 130 representing exposure time, aperture size, gain value, and lens position information and converts the digital values to respective control signals. Control signals corresponding to exposure time and aperture size are provided to shutter assembly 110, control signals corresponding to gain value are provided to image sensor array 120, while control signals corresponding to lens position are provided to lens assembly 115. It should be understood that the digital values corresponding to exposure time, aperture size, gain value and lens position represent an example configuration setting used to configure camera 100 for a desired brightness. However, depending on the implementation of shutter assembly 110, lens unit 115, and design of image sensor array 120, additional/different/subset parameters may be used to control the shutter assembly and lens unit as well.

Date/time unit 185 provides image processor 130 with the current date and time information, and can be set by image processor 130.

Display 140 displays an image frame in response to the corresponding display signals received from image processor 130. Display 140 may also receive various control signals from image processor 130 indicating, for example, which image frame is to be displayed, the pixel resolution to be used etc. Display 140 may also contain memory internally for temporary storage of pixel values for image refresh purposes, and is implemented in an embodiment to include an LCD display.

Input interface 160 provides a user with the facility to provide inputs, for example, to select features such as whether auto exposure and/or auto focus are to be enabled/disabled. The user may be provided the facility of any additional inputs, as described in sections below.

RAM 190 stores program (instructions) and/or data used by image processor 130. Specifically, pixel values that are to be processed and/or to be user later, may be stored in RAM 190 by image processor 130.

Non-volatile memory 150 stores image frames received from image processor 130. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc.), which store various instructions, which when executed by image processor 130 provide various features of the invention described herein. In general, such memory units (including RAMs, non-volatile memory, removable or not) from which instructions can be retrieved and executed by processors are referred to as a computer readable medium.

Image processor 130 forwards pixel values received to enable a user to view the scene presently pointed by the camera. Further, when the user 'clicks' a button (indicating intent to record the captured image on non-volatile memory 150), image processor 130 causes the pixel values representing the present (at the time of clicking) image to be stored in memory 150.

In addition, image processor 130 may configure shutter assembly 110, image sensor array 120, and lens unit 115 to obtain a desired exposure and focus on a scene according to several aspects of the present invention.

Figure 2:
FIG. 2 illustrates an example image of Christmas tree scene.

Referring now to FIG. 2, an example Christmas tree scene with multiple Christmas trees (to dark to be visible), in accordance with one embodiment. The scene also includes multiple lights and a dark background. The lights are typically connected by wires into strings. They are usually much brighter than the background and their sizes are usually small and they only occupies a small portion of the entire image.

The present invention is illustrated using grayscale images, whose pixel values are between 0 and 255. For color images, the identification can either be performed on the gray component of the images, or be applied on three components (e.g. RGB) of the images followed by a combination of the results.

Figure 3:
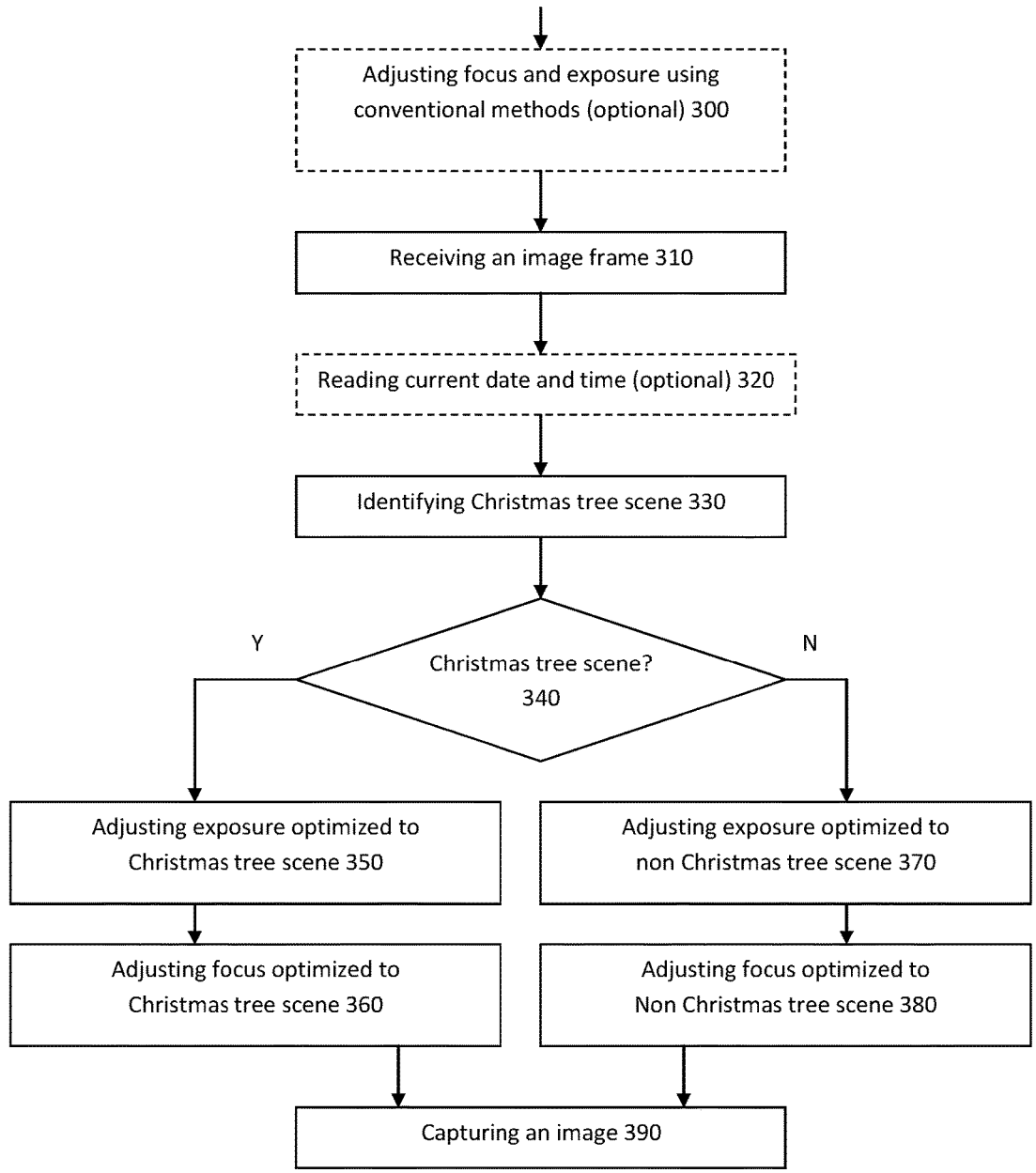
FIG. 3 illustrates a high-level flow chart depicting a method in accordance with an embodiment of a present teachings.

Referring now to FIG. 3, a flow chart depicting a method in accordance with an embodiment of a present teachings. Block 300 is an optional step. It adjusts the exposure and focus settings with conventional methods. This step could be helpful insuring a minimum quality of the input image frame. In 310, an input image frame is read. Step 320 is another optional step, which reads the current date and time. The image is analyzed in block 330 to identify the Christmas tree scene. The analysis may mainly rely on the facts that for a Christmas tree scene: 1) the background is dark; 2) the lights are bright; 3) the lights are small; and 4) the number of lights are numerous. It may also utilize the current date and time information. If the test result of 340 is positive, the automatic exposure and automatic focus settings are adjusted with the methods and parameters that are optimized for the Christmas tree scene in 350 and 360, respectively. If the result 340 is negative, the scene is determined not a Christmas tree scene. In steps 370 and 380 the automatic exposure and focus settings are adjusted in a conventional manner. The image is captures in 390 using the adjusted settings. If the optional block 200 is applied, steps 370 and 380 may not be necessary if the scene is not a Christmas tree. The input image frame can directly be used as the output.

Figure 4:
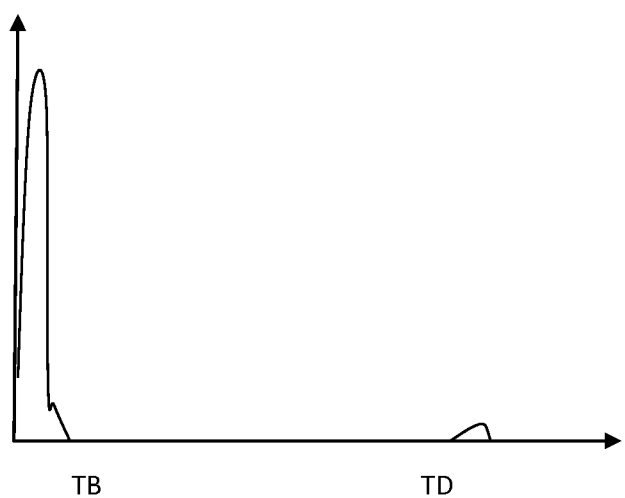
FIG. 4 illustrates an example histogram of the pixel intensity values of a Christmas tree scene image.

Referring now to FIG. 4, a histogram of the pixel intensity values of the Christmas tree scene image shown in FIG. 2. The histogram shows that most of the pixels in the image are dark and their intensity values are below a threshold TD, while a small portion of the pixels are bright and their intensity values are above a second threshold TB, which is much greater than TD.

A first embodiment of Christmas tree scene identification of a present teachings is based on the pixel intensity distribution analysis. First, the number of pixels in the image whose intensity value is below a pre-determined threshold TD1 is counted as ND1, and the number of pixels whose intensity values exceeds another pre-determined threshold TB1 is counted as NB1. Two ratios RD1 and RB1 are obtained by dividing ND1 and NB1 by the total number of pixels in the image, For a Christmas tree scene, RD1 is relatively large, as most pixels are dark background pixels. RB1, which characterizes the light pixels, is a small number, but is not too small. An scene is identified as a Christmas tree light scene if RD1>TRD1 and TRB1_upper>RB1>TRB1_lower, where TRD1, TRB1_lower and TRB1_upper are pre-determined thresholds. Otherwise, it is a non Christmas tree scene. An exemplar set of the thresholds is selected as TD1=64, TB1=196, TRD1=75%, TRB1_lower=0.5% and TRB1_upper=4%, respectively.

A second embodiment of embodiment of Christmas tree scene identification of a present teachings is also based on the pixel intensity distribution analysis. A histogram of the image is first created. A threshold TS2 is then determined that divides the histogram into two parts that have the greatest separation. This can be achieved by many existing binarization algorithms, such as Otsu's method. The number of pixels in the image whose intensity value is below TS is counted as ND2 and their average is calculated as MEAN2_D, and the number of pixels whose intensity values exceeds TS is counted as NB2, and their average is calculated as MEAN2_B. Two ratios RD2 and RB2 are obtained by dividing ND2 and NB2 by the total number of pixels in the image. An scene is identified as a Christmas tree scene if RD2>TRD2 and TRB2_upper>RB2>TRB2_lower, and MEAN2_B−MEAN2_D>T2, where TRD1, TRB1_lower, TRB1_upper, and TD are pre-determined thresholds. Otherwise, it is a non Christmas tree light scene. An exemplar set of the thresholds is selected as T2=196, TRB2=75%, TRD2_lower=0.5% and TRD2_upper=4%, respectively.

The simple intensity or color distribution based methods are straightforward in computation. However, they may not be very reliable as they do not utilize the size information. A relatively large bright object may contribute same amount of bright pixels as many small lights and thus confuse the algorithm.

Figure 5:
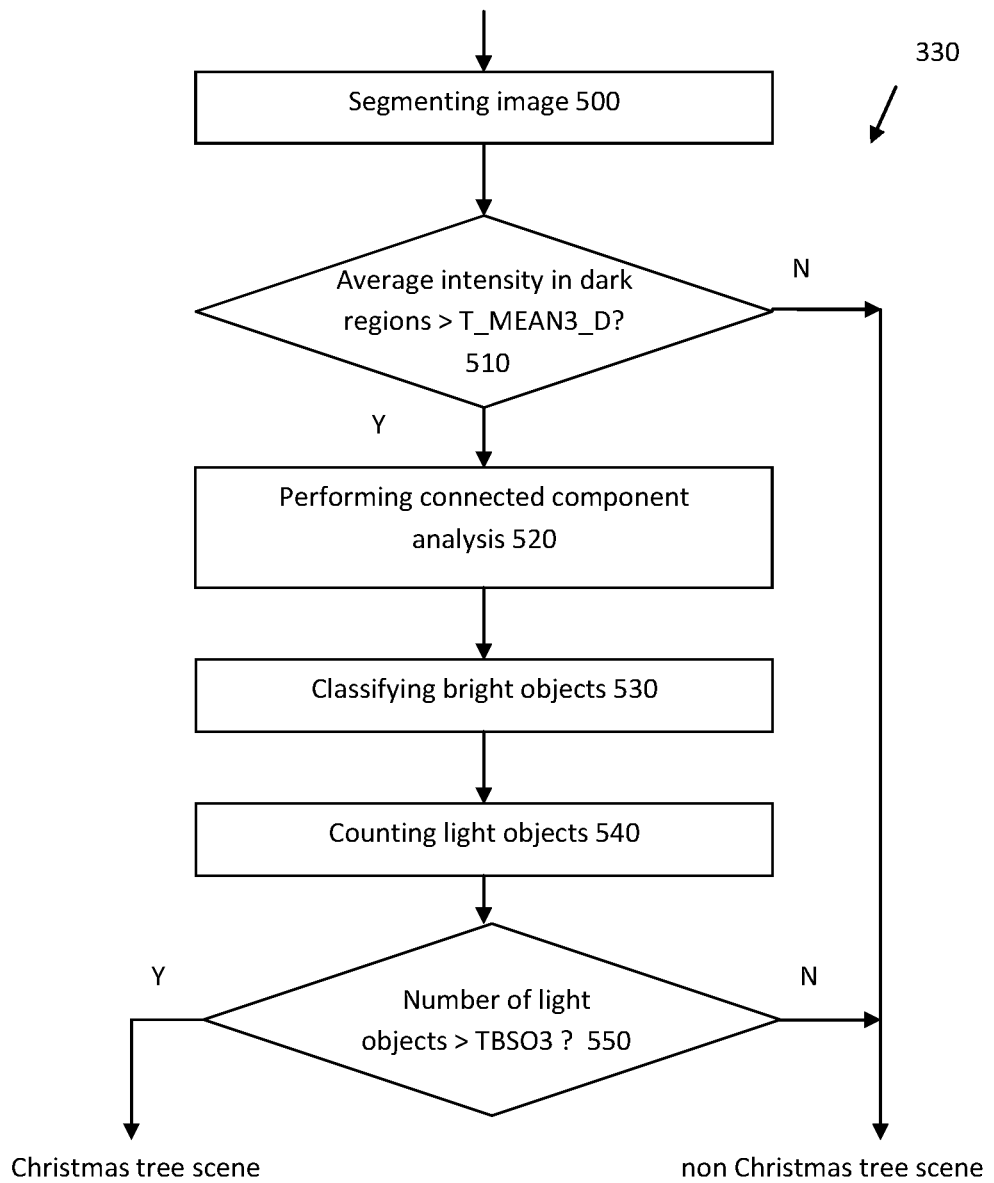
FIG. 5 illustrates a graph depicting a flow chart depicting a third embodiment of Christmas tree scene identification of a present teachings.
Figure 6:
FIG. 6 illustrates an example image of segmentation result of a Christmas tree scene image.

Referring now to FIG. 5, a flow chart depicting a third embodiment of Christmas tree scene identification of a present teachings, which is based on image segmentation and object analysis. The image is first segmented in block 500 into two kinds of regions, bright regions and dark regions. This can be achieved by many existing image segmentation and binarization algorithms, for example by thresholding with a predetermined threshold TB3_A, or by a threshold TB3_B which is selected based on the image content, for example by Otsu's method. Alternatively, a variable thresholding method may be applied that is adaptive to the image local statistics. There are many existing adaptive thresholding methods. In one embodiment, the threshold value is the sum of a constant and the local intensity average. For a typical image of Christmas tree scene, the segmented image contains often large dark regions representing background, and multiple small bright regions representing the lights. FIG. 6 shows an exemplar segmentation results for FIG. 2. If the average intensity for the pixels in the dark regions is greater than a threshold T_MEAN3_D, the image is considered non Christmas tree (510). In block 520, a connected component analysis is performed to group the connected bright pixels into bright objects. The connected component analysis is a standard procedure in Optical Character Recognition (OCR) and can be implemented using many existing methods. The bright objects are further classified in block 530 as light objects and other bright objects. A bright object is considered a light object if both of its bounding box dimensions (width and height) are smaller than a pre-determined threshold TS3. The number of light objects are counted in block 540. The image is classified in block 550. It is considered to be a Christmas tree scene if the number of light objects exceeds a pre-determined threshold TBSO3. Otherwise, it is not a Christmas tree scene. An exemplar set of the thresholds is selected as TB3=196_A, T_MEAN3_D=64, and TBSO3=30.

To save computation and buffering space, the segmentation may also be performed in a one-dimensional (1-D) fashion. Each scan line is segmented into bright and dark runs (1-D equivalence of regions). The classification decision is then based on the statistics of the runs. The scene is classified as Christmas tree scene if it contains enough number of short bright runs and if the average gray level for the pixels associated with dark runs is below a threshold.

Figure 7:
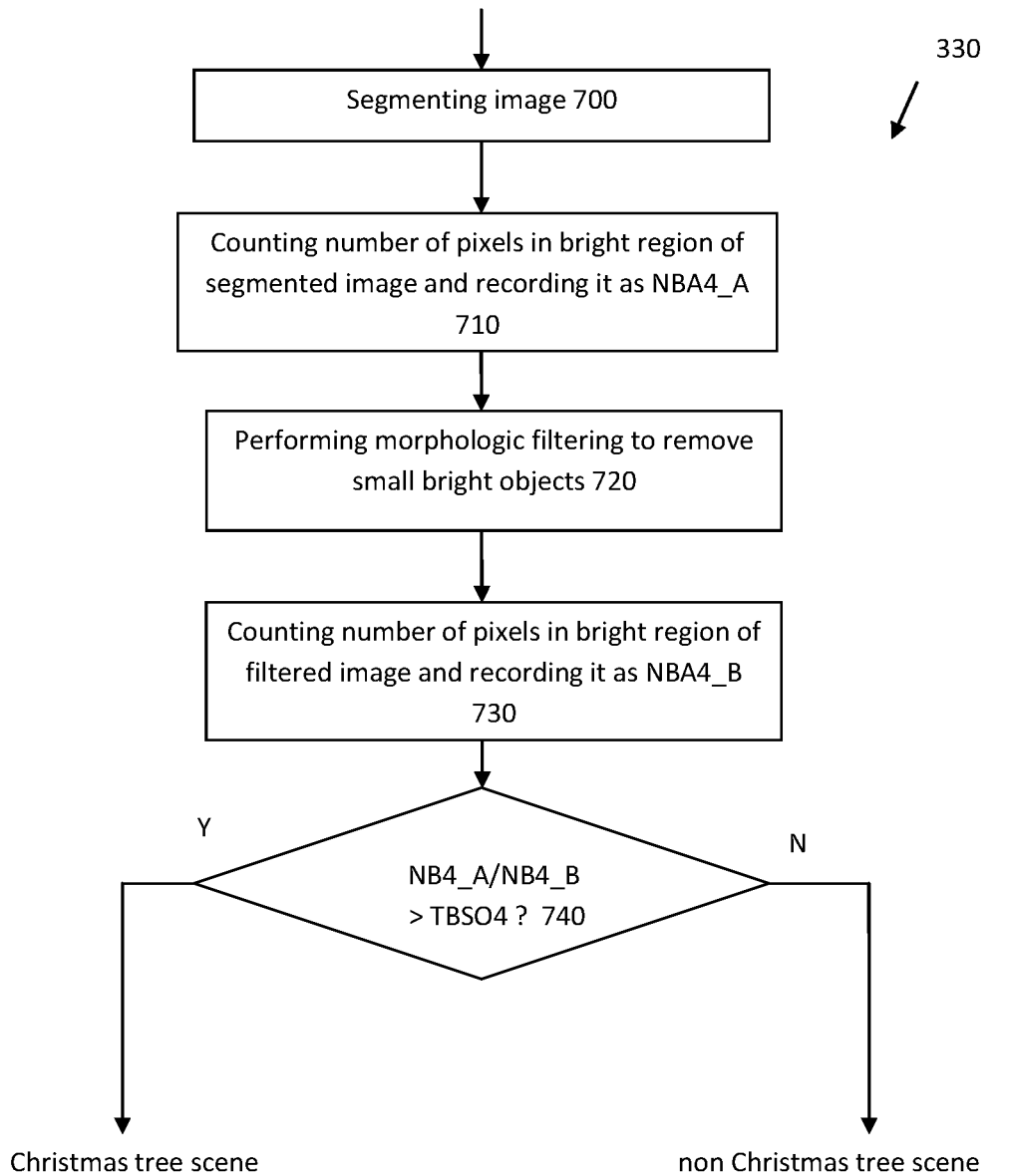
FIG. 7 illustrates a graph depicting a flow chart depicting a fourth embodiment of Christmas tree scene identification of a present teachings.

Referring now to FIG. 7, a flow chart depicting a fourth embodiment of Christmas tree scene identification of a present teachings, which is based on image segmentation and morphological filtering. Like the third embodiment, the image is first segmented into dark and bright regions (block 700). The total number of pixels in bright regions are counted as NB4_A (block 710). The segmented image is then filtered by a morphological filter, which removes the small bright objects (block 720). The number of the bright pixels is counted as NB4_B in the filtered image (block 730). The image is classified in block 740. It is considered to be a Christmas tree scene if (NB4_A/NB4_B)>a pre-determined threshold TBSO4. Otherwise, it is not a Christmas tree scene. An exemplar threshold is selected as TBSO4=10.

Figure 8:
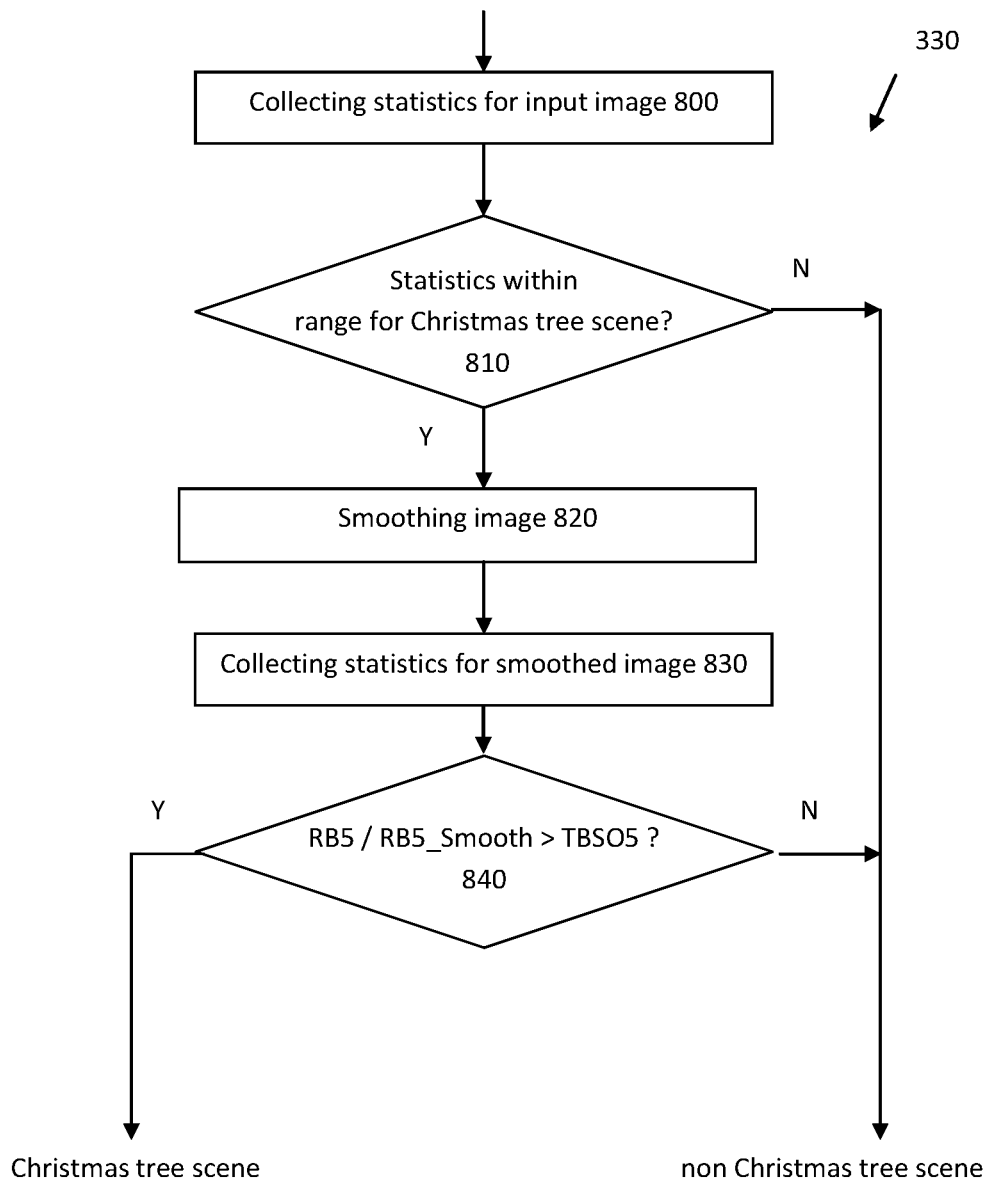
FIG. 8 illustrates a graph depicting a flow chart depicting a fifth embodiment of Christmas tree scene identification of a present teachings.

Referring now to FIG. 8, a flow chart depicting a fifth embodiment of Christmas tree scene identification of a present teachings, which is based on multiple resolution intensity or color distribution. In bock 800, the statistics of the original image is first extracted which includes RD5 and RB5, the ratios of pixels that is below a predetermined threshold TD5, and exceeds another predetermined threshold TB5, respectively. It is determined in block 810 whether the conditions of RD5>TRD5 and TRB5_upper>RB5>TRB5_lower are satisfied, where TRD5, TRB5_lower and TRB5_upper are predetermined thresholds. An exemplar threshold set is selected as TD5=64, TB5=196, TRD5=75%, TRB5_lower=0.5% and TRB5_upper=4%, respectively. If the conditions are satisfied, the process continues. Otherwise, the image is classified as a non Christmas tree scene. In block 820, the image is smoothed. In one embodiment, it is smoothed by an averaging filter. The window size of the filter is chosen such that it is much larger than the typical Christmas light size in the image. The smoothing blends the pixel of the lights with its surrounding background pixels. It significantly reduces the intensity of pixels of the lights in the image. Many other linear or non linear filters smoothing filters can also be applied here, for example Gaussian, triangle, median, and grayscale morphologic filters. In addition, the filtered image can be sub-sampled to reduce computation. In block 830, RB5_smooth, the ratio of pixels in the smoothed image that exceeds TB5_Smooth, another predetermined threshold is calculated. TB5_Smooth is typically no greater than TB5. An exemplar value for TB5_Smooth is 128. The image is classified in block 840. It is considered to be a Christmas tree scene if (RB5/RB5_Smooth)>a pre-determined threshold TBSO5. Otherwise, it is not a Christmas tree scene. An exemplar threshold is selected to be TBSO5=10.

Figure 9:
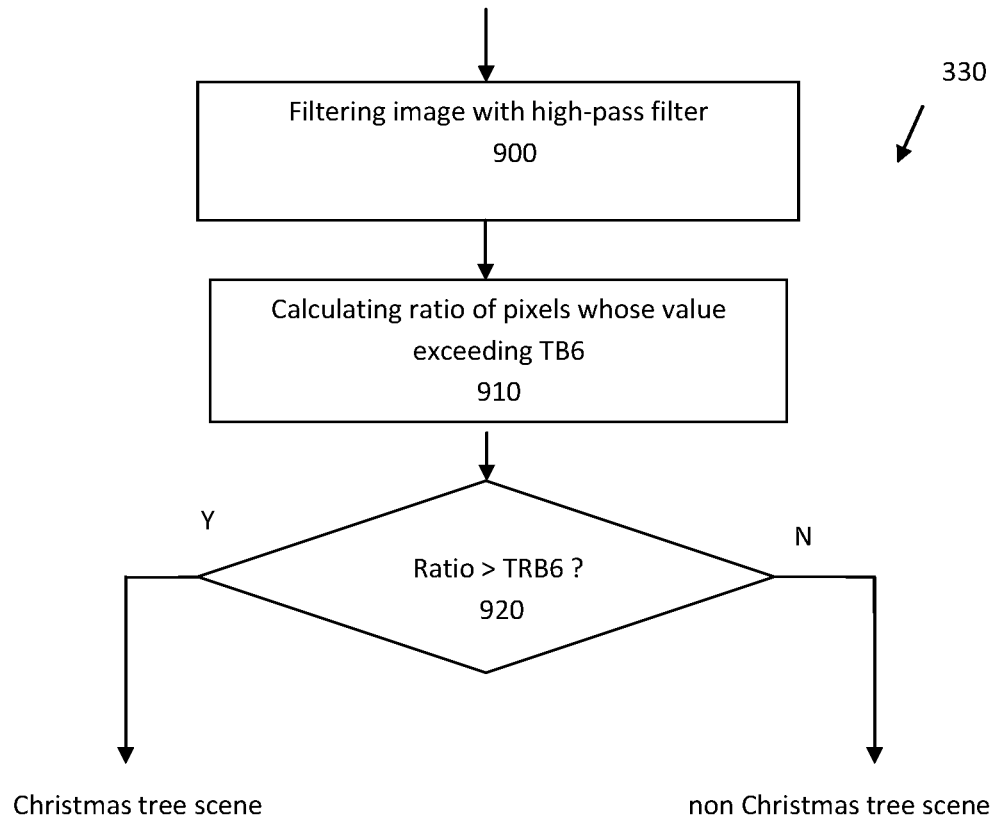
FIG. 9 illustrates a graph depicting a flow chart depicting a sixth embodiment of Christmas tree scene identification of a present teachings.

Referring now to FIG. 9, a flow chart depicting a sixth embodiment of Christmas tree scene identification of a present teachings, which is based on a combination of intensity/color distribution analysis and high-pass filtering. In block 900, the image is filtered by a high-pass filter. In one embodiment, the filter is implemented as the difference of the original image and the image filtered by an averaging filter. Many other known high pass filters or detail enhancing non-linear filters can also be applied here. In block 910, RB6, the ratio of pixels in the filtered image whose intensity exceeds TB6, a predetermined threshold is calculated. An exemplar value for TB6 is 128. The image is classified in block 920. It is considered to be a Christmas tree scene if RB6 is greater than a pre-determined threshold TRB6. Otherwise, it is not a Christmas tree scene. An exemplar threshold is selected as TRB6=1%.

The current date and time information is also useful in the scene identification. It is much more likely to be a Christmas tree scene if the image is taken during Christmas season than taken in August. It is also much more likely to be a Christmas tree scene if the picture is taken at 8 pm than if it is taken at noon time. The date and time information can be incorporated into the Christmas tree scene identification methods disclosed above. Multiple sets of thresholds and other parameters are used for different dates and times. More stringent conditions are imposed if a picture is taken at a data/time that is associated with a low likelihood of Christmas tree scene. For example, for the sixth embodiment, the thresholds are set to TB6=128 and TRB6=1%. for a high likelihood date/time and set to TB6=196 and TRB6=2%. for a low likelihood date/time.

Figure 10:
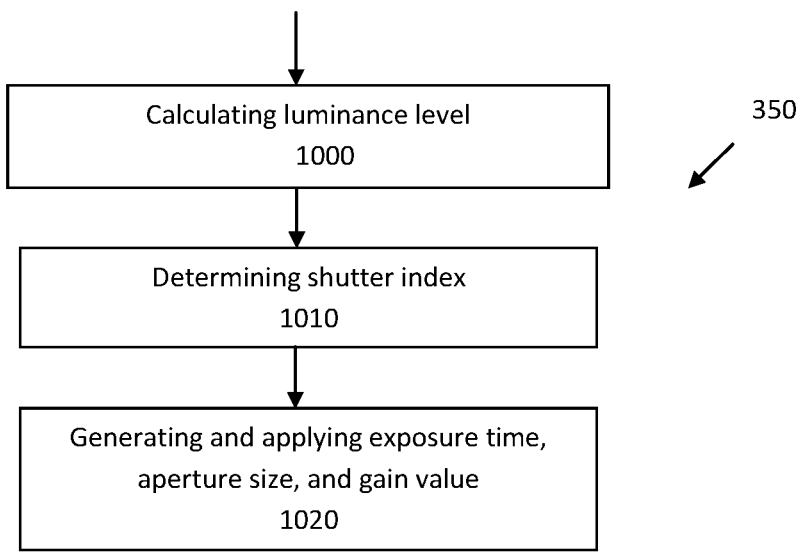
FIG. 10 illustrates a graph depicting a flow chart depicting an embodiment of exposure adjustment optimized for the Christmas tree scene a of a present teachings.

Referring now to FIG. 10, a flow chart depicting an embodiment of exposure adjustment that is optimized for the Christmas tree scene of a present teachings. In 1000, a luminance level optimized for Christmas tree scene is calculated. In conventional methods, the luminance level is calculated as the mean value of the entire image, of a region of interest, or over a multiple windows of the image. This is often reasonable for non Christmas tree scenes. However, for Christmas tree scenes, the mean typically contains mainly the contributions from the dark background pixels and tends to have a downward bias. In one embodiment of the present invention, the luminance level of the image (or the region of interest, or multiple windows of the image) is calculated as an upward adjusted version of the mean value, for example, luminance=c1×255+(1−c1)×mean, where c1 is a pre-determined weighting factor (for example 0.5). In another embodiment of the present invention, the luminance level is calculated as luminance=c2×top luminance value+(1−c2)×bottom luminance value, where c2 is another pre-determined weighting factor (for example 0.5), top luminance value and bottom luminance value are estimated by for example p1-percentile and (1−p2)-percentile, where and p1 and p2 are small values (for example, 1 or 3). Once the luminance level is calculated, a shutter index is determined in block 1010 according to the difference between the luminance level and the target luminance. In block 1020, the shutter index is applied to generate exposure parameters and send the parameters to the image sensor and shutter assembly. Both steps 1010 and 1020 are well known, and can be found in the literature, for example, U.S. Pat. No. 8,115,829 and U.S. Pat. No. 7,643,069.

In conventional methods, focus is adjusted that maximizes image contrast. The methods do not work well for Christmas tree scene image. In one embodiment of present invention, the focus is adjusted according to the light size in the image (or the region of interest of the image, or a multiple windows of the image) for Christmas tree scene image. This is based on the observation that the light size becomes smaller when the image is captured with a better focus. The light size can be measured in one embodiment by counting the number of pixels whose intensity exceeds a threshold T9 (an exemplar value for T9 is 196). To search the focus that minimizing the light size, many existing searching/optimization methods can be applied here. A simple method would be capturing images with different focus settings and calculating the light size for each setting. The setting associated with the least light size is considered optimal focus setting.

Instead of yes/no decision in Christmas tree scene identification, a soft or fuzzy decision can also be made. In one embodiment, a decision score that measures the confidence level of the decision may also be estimated as a part of the identification output. The score may be produced by many existing methods. For example, it may be estimated according to the distance of the feature values to the decision boundary. As an example, for the sixth embodiment of Christmas tree scene identification, a score can be evaluated as Min [(RB6−TRB6)*10, 100], if the scene is identified as a Christmas tree scene.

If an image is identified as a Christmas tree scene, but with a low decision score, the exposure and focus settings may be determined by combining the conventional settings with the settings that are optimized for Christmas tree scene. This can be achieved by many existing combination methods, for example, by a weighted sum.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for performing an auto-exposure or auto-focus operation in an image capture device, the method comprising:
   receiving a plurality sets of pixel values representing an image of a scene;
   classifying said scene as Christmas tree scene or non-Christmas tree scene;
   performing a first focus adjustment method or applying a first set of focus adjustment parameters, or performing a first exposure adjustment method or applying a first set of exposure adjustment parameters if said scene is classified as Christmas tree scene;
   performing a second focus adjustment method or applying a second set of focus adjustment parameters if said scene is classified as non-Christmas tree scene, wherein said second focus adjustment method is substantially different from said first focus adjustment method, or said second set of focus adjustment parameters are substantially different from said first set of focus adjustment parameters, or
   performing a second exposure adjustment method or applying a second set of exposure adjustment parameters if said scene is classified as non-Christmas tree scene, wherein said second exposure adjustment method is substantially different from said first exposure adjustment method, or said second set of exposure adjustment parameters are substantially different from said first set of exposure adjustment parameters.

2. The method of claim 1, wherein said classifying further comprises:
   segmenting said image into one or more bright and dark regions;
   classifying said bright regions into light objects and non light bright objects;
   collecting statistics for said light objects;
   labeling said image as said Christmas tree scene or said non-Christmas tree scene according to said light object statistics.

3. The method of claim 1, wherein said classifying further comprises:
   collecting statistics for said image;
   receiving a date or a time corresponding said scene captured;
   labeling said image as said Christmas tree scene or said non-Christmas tree scene according to said statistics, combined with said date/time.

4. The method of claim 1, wherein said classifying further comprises:
   collecting statistics for said image;
   filtering said image to produce a filtered image
   collecting statistics for said filtered image;
   labeling said image as said Christmas tree scene or said non-Christmas tree scene according to a difference between said statistics for said image and said statistics for said filtered image.

5. The method of claim 1, wherein said first exposure adjustment method further comprises:
   calculating a mean luminance value of said image, a region of interest of said image, or one or more windows of said image;
   determining an adjusted mean value by adjusting said mean luminance value upwards;
   determining a shutter index according to the difference between said adjusted mean value and a target value;
   generating and applying exposure control signals based on said shutter index.

6. The method of claim 1, wherein said first exposure adjustment method further comprises:
   calculating a top luminance value of said image, a region of interest of said image, or one or more windows of said image;
   determining an luminance value according to said top luminance value;
   determining a shutter index according to a difference between said luminance value and a target value;
   generating and applying exposure control signals based on said shutter index.

7. The method of claim 1, wherein said first focus adjustment method further comprises:
   capturing a plurality of images, wherein each image of the plurality of images is captured with a lens at a different lens position of the imaging system;
   estimating a light size value of each image of the plurality of images;
   identifying a particular image of said plurality of images that comprises a smallest light size value;

identifying a lens position where said particular image with smallest light size value was captured;
moving said lens of the imaging system to a position associated with said lens position.

8. A non-transitory computer readable medium carrying one or more sequences of instructions for operating a shutter assembly and a focus unit in an image capture device (ICD) wherein execution of said one or more sequences of instructions by one or more processors contained in said ICD causes said one or more processors to perform the actions of:
receiving a plurality sets of pixel values representing an image of a scene;
classifying said scene as Christmas tree scene or non-Christmas tree scene;
performing a first focus adjustment method or applying a first set of focus adjustment parameters, or performing a first exposure adjustment method or applying a first set of exposure adjustment parameters if said scene is classified as Christmas tree scene;
performing a second focus adjustment method or applying a second set of focus adjustment parameters if said scene is classified as non-Christmas tree scene, wherein said second focus adjustment method is substantially different from said first focus adjustment method, or said second set of focus adjustment parameters are substantially different from said first set of focus adjustment parameters, or
performing a second exposure adjustment method or applying a second set of exposure adjustment parameters if said scene is classified as non-Christmas tree scene, wherein said second exposure adjustment method is substantially different from said first exposure adjustment method, or said second set of exposure adjustment parameters are substantially different from said first set of exposure adjustment parameters.

9. The non-transitory computer readable medium of claim 8, wherein said classifying further comprises:
segmenting said image into one or more bright and dark regions;
classifying said bright regions into light objects and non light bright objects;
collecting statistics for said light objects;
labeling said image as said Christmas tree scene or said non-Christmas tree scene according to said light object statistics.

10. The non-transitory computer readable medium of claim 8, wherein said classifying further comprises:
collecting statistics for said image;
receiving a date or a time corresponding said scene captured;
labeling said image as said Christmas tree scene or said non-Christmas tree scene according to said statistics, combined with said date/time.

11. The non-transitory computer readable medium of claim 8, wherein said classifying further comprises:
collecting statistics for said image, or a region of interest of said image;
filtering said image to produce a filtered image
collecting statistics for said filtered image;
labeling said image as said Christmas tree scene or said non-Christmas tree scene according to a difference between said statistics for said image and said statistics for said filtered image.

12. The non-transitory computer readable medium of claim 8, wherein said first exposure adjustment method further comprises:
calculating a mean luminance value of said image, a region of interest of said image, or one or more windows of said image;
determining an adjusted mean value by adjusting said mean luminance value upwards;
determining a shutter index according to the difference between said adjusted mean value and a target value;
generating and applying exposure control signals based on said shutter index.

13. The non-transitory computer readable medium of claim 8, wherein said first exposure adjustment method further comprises:
calculating a top luminance value of said image, a region of interest of said image, or one or more windows of said image;
determining an luminance value according to said top luminance value;
determining a shutter index according to a difference between said luminance value and a target value;
generating and applying exposure control signals based on said shutter index.

14. The non-transitory computer readable medium of claim 8, wherein said first focus adjustment method further comprises:
capturing a plurality of images, wherein each image of the plurality of images is captured with a lens at a different lens position of the imaging system;
estimating a light size value of each image of the plurality of images;
identifying a particular image of said plurality of images that comprises a smallest light size value;
identifying a lens position where said particular image with smallest light size value was captured;
moving said lens of the imaging system to a position associated with said lens position.

15. An image capture device (ICD) for capturing an image of a scene, said ICD comprising:
a lens unit configured with a focus lens which is movable along an optical axis in order to focus an optical image formed on an image sensor array, said lens unit allowing the optical image of a subject to be formed on said image sensor array;
an image sensor array designed to generate a plurality of sets of pixel values;
a shutter assembly configurable to control an amount of light incident on said image sensor array, wherein each set of pixel values represents a corresponding image of a scene at a corresponding time instance and is obtained with said shutter assembly configured using one of a plurality of sets of exposure parameters, wherein each set of exposure parameters is configured to obtain a different level of brightness and causes said image to be captured on said image sensor array with a corresponding level of brightness;
a date/time unit designed to provide current date and time;
an image processor designed to:
receiving a plurality sets of pixel values representing an image of a scene;
classifying said scene as Christmas tree scene or non-Christmas tree scene;
performing a first focus adjustment method and applying a first set of focus adjustment parameters, or performing a first exposure adjustment method and applying a first set of exposure adjustment parameters if said scene is classified as Christmas tree scene;
performing a second focus adjustment method or applying a second set of focus adjustment parameters if said scene is classified as non-Christmas tree scene, wherein said second focus adjustment method is substantially different from said first focus adjustment method, or said second set of focus adjustment parameters are substantially different from said first set of focus adjustment parameters, or performing a second exposure adjustment method or applying a second set of exposure adjustment parameters if said scene is classified as non-Christmas tree scene, wherein said second exposure adjustment method is substantially different from said first exposure adjustment method, or said second set of exposure adjustment parameters are substantially different from said first set of exposure adjustment parameters.

16. The ICD of claim 15, wherein said classifying further comprises:

segmenting said image into one or more bright and dark regions;
classifying said bright regions into light objects and non light bright objects;
collecting statistics for said light objects;
labeling said image as said Christmas tree scene or said non-Christmas tree scene according to said light object statistics.

17. The ICD of claim 15, wherein said classifying further comprises:

collecting statistics for said image;
filtering said image to produce a filtered image
collecting statistics for said filtered image;
labeling said image as said Christmas tree scene or said non-Christmas tree scene according to a difference between said statistics for said image and said statistics for said filtered image.

18. The ICD of claim 15, wherein said first exposure adjustment method further comprises:

calculating a mean luminance value of said image, a region of interest of said image, or one or more windows of said image;
determining an adjusted mean value by adjusting said mean luminance value upwards;
determining a shutter index according to the difference between said adjusted mean value and a target value;
generating and applying exposure control signals based on said shutter index.

19. The ICD of claim 15, wherein said first exposure adjustment method further comprises:

calculating a top luminance value of said image, a region of interest of said image, or one or more windows of said image;
determining an luminance value according to said top luminance value;
determining a shutter index according to a difference between said luminance value and a target value;
generating and applying exposure control signals based on said shutter index.

20. The ICD of claim 15, wherein said first focus adjustment method further comprises:

capturing a plurality of images, wherein each image of the plurality of images is captured with a lens at a different lens position of the imaging system;
estimating a light size value of each image of the plurality of images;
identifying a particular image of said plurality of images that comprises a smallest light size value;
identifying a lens position where said particular image with smallest light size value was captured;
moving said lens of the imaging system to a position associated with said lens position.

* * * * *